United States Patent [19]

New

[11] Patent Number: 4,770,547

[45] Date of Patent: Sep. 13, 1988

[54] BEARINGS

[75] Inventor: Nigel H. New, Harrow, England

[73] Assignee: AE PLC, Rugby, England

[21] Appl. No.: 55,305

[22] Filed: May 29, 1987

[30] Foreign Application Priority Data

Jun. 3, 1986 [GB] United Kingdom ............... 8613411

[51] Int. Cl.⁴ ............................................. F16C 17/04
[52] U.S. Cl. ..................................... 384/429; 384/420
[58] Field of Search ............... 384/322, 368, 420–427, 384/429–437, 288, 294, 250; 74/594; 123/196 R, 198 DA

[56] References Cited

U.S. PATENT DOCUMENTS 2,953,416 9/1960 Collins et al. ................... 384/368 X
4,133,586 1/1979 Maurer ............................... 384/429

FOREIGN PATENT DOCUMENTS 2638996 3/1978 Fed. Rep. of Germany ...... 384/429
2900277 7/1980 Fed. Rep. of Germany ...... 384/429
2920818 12/1980 Fed. Rep. of Germany ...... 384/429

Primary Examiner—Stuart S. Levy
Assistant Examiner—Thomas R. Hannon
Attorney, Agent, or Firm—William R. Hinds

[57] ABSTRACT

Thrust bearings are described comprising a substantially planar thrust accepting member having at least one locating portion substantially at a right angle thereto and which is adapted to co-operate with a recess formed in the bearing housing. In a preferred embodiment there are two locating portions and the co-operating recesses in the bearing housing have re-entrant geometry to prevent accidental displacement of the thrust bearing during installation of the shaft.

9 Claims, 3 Drawing Sheets

BEARINGS

The present invention relates to bearings and particularly to the retention and location of thrust bearings of the type used, for example, in internal combustion engines and compressors.

It is known to locate and retain thrust washer type bearings in a rebate or recess machined into the crankcase or bearing cap of an engine for example.

In some engine constructions, however, there is no provision for the machining of a rebate in which to locate and retain a thrust bearing. Such engines often employ what are known as flanged bearings wherein the journal and thrust bearing elements are of unitary construction. Flanged bearings are difficult and costly to produce and are also not particularly amenable to installation in an engine by automated assembly methods. European patent No. 0184693 of common inventorship herewith discloses bearings which overcome the problems of cost and difficulty of manufacture of flanged bearings. In the present case, however, where there is no provision for location and retention of the thrust bearing elements in the engine bearing housing some engine manufacturers are concerned lest the thrust bearings become detached from the journal bearings.

The present invention provides a thrust bearing which is independently located and thus may be used as a separate element or which provides additional security if combined with a combined journal and thrust bearing as in EP No. 0184693.

According to the present invention a thrust bearing comprises a substantially planar thrust accepting bearing member having at least one locating portion substantially at a right angle to the thrust accepting member and which portion co-operates with a recess in a bearing housing, the recess being adapted to receive the at least one locating portion.

In a preferred embodiment of the present invention there are two locating portions substantially at right angles to the planar member one portion being at each extremity of the thrust bearing. The locating portions may be formed by bending over of an extension to a blank formed from a strip of bearing material. The bearing material may be any known in the art such as, for example, leaded-bronze, whitemetal, aluminium alloy. The bearing material may furthermore be applied to a strong backing material such as, for example, steel or a copper based alloy.

By suitable shaping of the locating portions and their co-operating recesses in the bearing housing mechanical interference may be obtained to prevent accidental displacement of the thrust bearing during engine assembly.

In order that the present invention may be more fully understood examples will now be described by way of illustration only with reference to the accompanying drawings of which:

Figure 5:
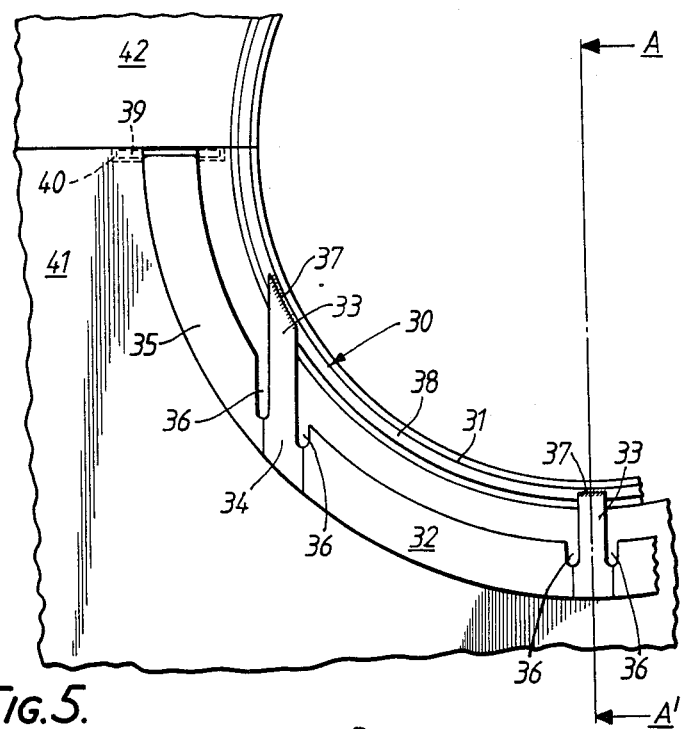
Figure 6:
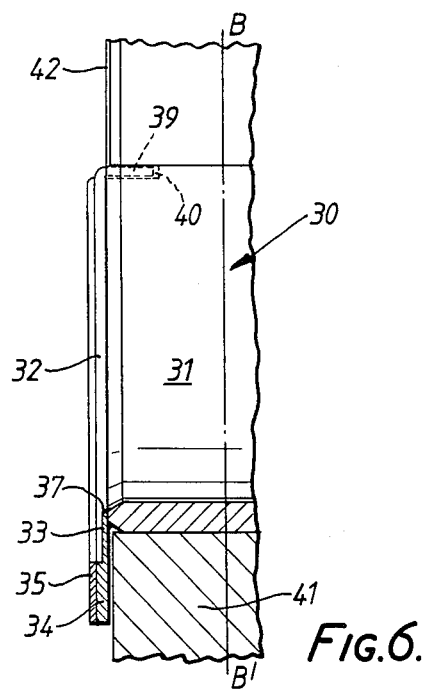

FIGS. 4(a) to 4(d) show alternative geometries of locating portions and co-operating recesses of thrust bearings according to the present invention;

FIG. 5 shows part of a composite bearing comprising a journal bearing element and a thrust bearing element according to the present invention; and FIG. 6 shows a section through FIG. 5 on the line AA' looking in the direction of the arrows.

Figure 1:
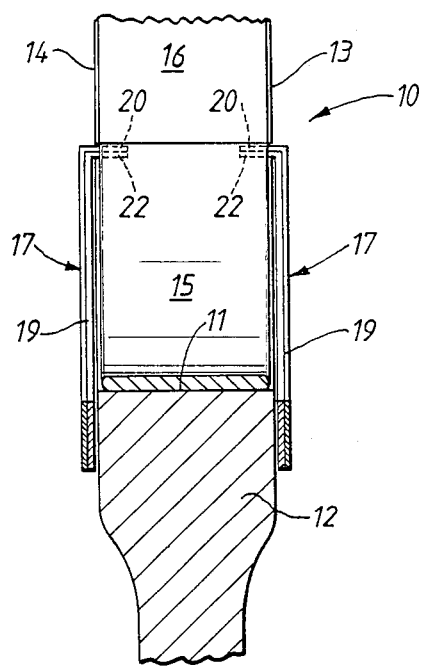
FIG. 1 shows a section in elevation of a bearing and housing assembly utilising thrust bearings according to the present invention.
Figure 2:
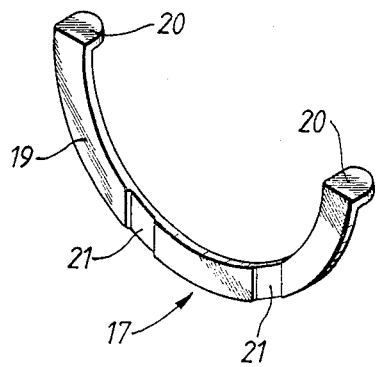
FIG. 2 shows a perspective view of a thrust bearing according to the present invention.
Figure 3:
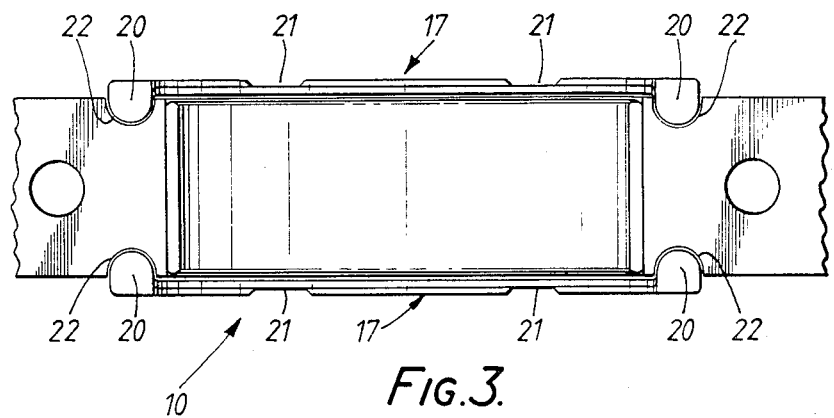
FIG. 3 shows a plan view of the assembly of FIG. 1 but without a bearing cap member.
Figure 4A:
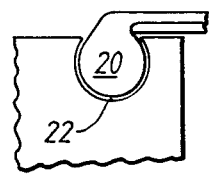
Figure 4B:
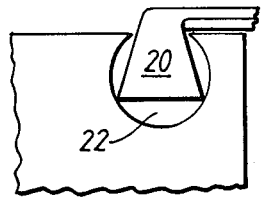
Figure 4C:
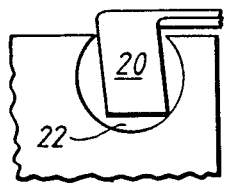
Figure 4D:
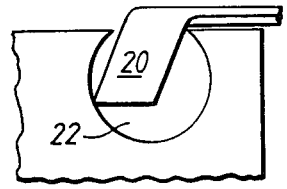

Referring now to FIGS. 1, 2 and 3 and where corresponding features are denoted by common reference numerals.

A bearing housing and bearing is denoted generally at 10. The assembly comprises a journal bearing housing 11 in a crankcase 12 and a journal bearing housing 13 in a cap member 14. Bearing journal liners 15 and 16 are fitted into the housings 11 and 13. Thrust washers 17 accept axial thrust loads imposed by a shaft (not shown). The thrust washers 17 comprise a generally semi-circular portion 19 and tab portions 20 which are bent over from a flat blank. The washers 17 are blanked from flat strip having a steel backing and a lining of bearing material. Oil drain grooves 21 are provided by removal of the lining material. The tab portions 20 locate in recesses 22 which are machined into the flat split line of the bearing housing. In this case the recesses 22 are produced by end-milling the crankcase 12. The recesses 22 may, however, be formed in the cap member 14 or partially in the crankcase 12 and partially in the cap 14. The thrust washers 17 are retained in place by the cap member 14 and the thrust faces of the crankshaft 18 (not shown).

FIGS. 4(a) to (d) show a recess 22 of re-entrant form in plan view. Alternative tab portion shapes 20 are shown which lock by virtue of the mechanical interference between the recess 22 and tab 20. Any suitable alternative recess shape may be used as may any tab shape and the examples given are by no means comprehensive. The circular recess 22 is shown since it is the easiest shape to form by, for example, end-milling. It will be appreciated that the examples of FIG. 4 provide thrust washers which will not easily be accidentally dislodged and which are amenable to robotic assembly.

FIGS. 5 and 6 show a composite bearing 30, symmetrical about the lines AA' and BB' and comprising a journal bearing element 31 and a thrust bearing element 32. The thrust bearing 32 is joined to the journal bearing 31 by tags 33 formed from the steel backing 34 of the thrust bearing 32. The bearing lining 35 and part of the steel backing 34 is machined away as are portions 36 in order to enhance the flexibility of the tags 33. The thrust bearing 32 is connected to the journal bearing 31 by projection welds 37 on the journal bearing end face 38 which is specially profiled to a relatively fine edge. At the extremities of the thrust bearing 32 are tab portions 39 which fit into and co-operate with recesses 40 in the crankcase 41. The tabs 39 are prevented from moving by a cap member 42 bolted in position. By means of the tabs 39 and recesses 40 the thrust bearing is permanently maintained in position even if the welds 37 should fracture.

In the examples given above the tab portions have been formed by bending over of the end portions of the thrust washer blank. The tabs may be formed by, for example, welding on of separate pieces.

Thrust bearings according to the present invention may be used on one or both sides of a bearing housing as appropriate according to the engine or compressor design.

I claim:

1. In combination, a bearing housing, and a thrust bearing comrpising a substantially semi-circular, planar thrust-accepting bearing member having a locating portion at each circumferential extremity thereof, substantially at a right angle to the plane of said thrust-accepting member and which portions cooperate with recesses in the bearing housing to prevent both rotation of said thrust bearing and axial disengagement of said thrust bearing from said housing.

2. Apparatus as claimed in claim 1 wherein said bearing housing is a journal bearing housing.

3. Apparatus according to claim 2 wherein said locating portions are formed with re-entrant geometry with respect to said cooperating recesses so as to lock by mechanical interference against axial disengagement.

4. Apparatus as claimed in claim 2 wherein said journal bearing housing contains a journal bearing, and said locating portions and said recesses are located radially outwardly of the journal bearing.

5. Apparatus as claimed in claim 4 wherein said thrust-accepting member is permanently attached to said journal bearing by thin, flexible metal tags.

6. Apparatus as claimed in claim 1 wherein said bearing housing includes a journal bearing bore, and said locating portions and said recesses lie radially outwardly of the journal bearing bore.

7. A bearing assembly comprising at least one thrust bearing and a journal bearing wherein said at least one thrust bearing comprises a substantially semi-circular, planar thrust-accepting bearing member having a locating portion at each circumferential extremity thereof extending substantially at a right angle to said thrust-accepting member and which locating portions lie radially outwardly of the journal bearing so as to cooperate with recesses in a bearing housing to prevent both rotation of said thrust bearing and axial disengagement of said thrust bearing from said housing, and wherein said thrust bearing is also permanently attached to said journal bearing by thin, flexible metal tags.

8. A bearing assembly according to claim 7 in combination with a bearing housing, wherein said locating portions have re-entrant geometry with respect to said cooperating recesses so as to lock by mechanical interference against axial disengagement.

9. A bearing assembly as claimed in claim 7 in combination with a bearing housing having a bearing bore, said locating portions and said recesses lying radially outwardly of the bearing bore.

* * * * *